United States Patent
Clements

(10) Patent No.: US 9,663,703 B2
(45) Date of Patent: May 30, 2017

(54) METHOD AND COMPOSITIONS FOR ENHANCED OIL RECOVERY

(71) Applicant: James George Clements, Brentwood, NH (US)

(72) Inventor: James George Clements, Brentwood, NH (US)

(*) Notice: Subject to any disclaimer, the term of this patent is extended or adjusted under 35 U.S.C. 154(b) by 168 days.

(21) Appl. No.: 14/262,047

(22) Filed: Apr. 25, 2014

(65) Prior Publication Data
US 2015/0307768 A1    Oct. 29, 2015

(51) Int. Cl.
*C09K 8/588* (2006.01)
*E21B 43/16* (2006.01)

(52) U.S. Cl.
CPC .............. *C09K 8/588* (2013.01); *E21B 43/16* (2013.01)

(58) Field of Classification Search
None
See application file for complete search history.

(56) References Cited

U.S. PATENT DOCUMENTS

| | | |
|---|---|---|
| 1,181,178 A | 5/1916 | Simms |
| 2,082,189 A | 6/1937 | Twomey |
| 2,800,823 A | 7/1957 | Tugend |
| 2,827,964 A | 3/1958 | Sandiford et al. |
| 2,923,734 A | 2/1960 | Sheetz |
| 2,938,017 A | 5/1960 | Grosser |
| 3,305,016 A | 2/1967 | Lindblom et al. |
| 3,343,601 A | 9/1967 | Pye |
| 3,372,749 A | 3/1968 | Williams |
| 3,399,725 A | 9/1968 | Pye |
| 3,508,612 A | 4/1970 | Reisberg et al. |
| 3,572,354 A * | 3/1971 | Tinsley ..................... C09K 8/68 137/13 |
| 3,638,728 A | 2/1972 | Hill |
| 3,792,371 A | 2/1974 | Tomiyama et al. |
| 3,811,504 A | 5/1974 | Flournoy et al. |
| 3,811,507 A | 5/1974 | Flournoy et al. |
| 3,946,812 A | 3/1976 | Gale et al. |
| 3,948,740 A | 4/1976 | Phalangas |
| 3,953,341 A | 4/1976 | Martin |
| 3,977,471 A | 8/1976 | Gale et al. |
| 4,008,165 A | 2/1977 | Maddox, Jr. et al. |
| 4,018,278 A | 4/1977 | Shupe |
| 4,040,490 A | 8/1977 | Anderson |
| 4,059,154 A | 11/1977 | Braden, Jr. et al. |
| 4,059,533 A | 11/1977 | Watson et al. |

(Continued)

FOREIGN PATENT DOCUMENTS

| | | |
|---|---|---|
| RE | 32114 | 4/1986 |
| WO | WO92/19753 A1 | 11/1992 |
| WO | WO2012/138485 A2 | 10/2012 |

OTHER PUBLICATIONS

Sigma Aldrich, Sodium hydroxide, 1 page, printed Jun. 1, 2016.*

(Continued)

*Primary Examiner* — Alicia Bland
(74) *Attorney, Agent, or Firm* — Paul & Paul

(57) ABSTRACT

A powder composition for use in preparing flooding fluid for use in petroleum recovery from a petroleum-bearing formation includes an oxygen scavenger and a polymer material. Methods for preparing flooding fluid and for petroleum recovery from a petroleum-bearing formation employ the powder composition.

16 Claims, 1 Drawing Sheet

(56) References Cited

U.S. PATENT DOCUMENTS

| | | |
|---|---|---|
| 4,077,471 A | 3/1978 | Shupe et al. |
| 4,088,189 A | 5/1978 | Shupe |
| 4,094,789 A | 6/1978 | Kemper |
| 4,120,538 A | 10/1978 | Headen |
| 4,120,800 A | 10/1978 | Valcho et al. |
| 4,122,020 A | 10/1978 | Valcho et al. |
| 4,128,482 A | 12/1978 | Knight |
| 4,141,982 A | 2/1979 | Habicht et al. |
| 4,143,716 A | 3/1979 | Kalfoglou et al. |
| 4,157,306 A | 6/1979 | Kalfoglou et al. |
| 4,161,982 A | 7/1979 | Schievelbein et al. |
| 4,178,073 A | 12/1979 | Uchida et al. |
| 4,181,178 A | 1/1980 | Savins |
| 4,184,594 A | 1/1980 | Hehn |
| 4,187,073 A | 2/1980 | Schievelbein |
| 4,187,178 A | 2/1980 | Brown |
| 4,187,185 A | 2/1980 | Park et al. |
| 4,192,382 A | 3/1980 | Schievelbein |
| 4,192,755 A | 3/1980 | Flournoy et al. |
| 4,192,767 A | 3/1980 | Flournoy et al. |
| 4,194,565 A | 3/1980 | Kalfoglou |
| 4,214,999 A | 7/1980 | Carlin et al. |
| 4,218,327 A | 8/1980 | Wellington |
| 4,254,249 A | 3/1981 | Cottrell et al. |
| 4,284,517 A | 8/1981 | Chen et al. |
| 4,293,428 A | 10/1981 | Gale et al. |
| 4,295,980 A | 10/1981 | Motz |
| 4,296,812 A | 10/1981 | Kalfoglou |
| 4,326,970 A | 4/1982 | Cottrell et al. |
| 4,331,543 A | 5/1982 | Wilson et al. |
| 4,340,492 A | 7/1982 | Stournas |
| 4,343,711 A | 8/1982 | Kalfoglou |
| 4,406,799 A | 9/1983 | Hunter |
| 4,414,334 A | 11/1983 | Hitzman |
| 4,425,246 A | 1/1984 | Holzwarth et al. |
| 4,426,302 A | 1/1984 | McCoy et al. |
| 4,426,303 A | 1/1984 | Nuckels et al. |
| 4,433,727 A | 2/1984 | Argabright et al. |
| 4,455,254 A | 6/1984 | Stapp |
| 4,455,255 A | 6/1984 | Stapp |
| 4,458,753 A * | 7/1984 | Philips .................. C09K 8/905 166/246 |
| 4,460,481 A | 7/1984 | Schievelbein |
| 4,468,342 A | 8/1984 | Chen |
| 4,469,604 A | 9/1984 | Stapp et al. |
| 4,503,909 A | 3/1985 | Argabright et al. |
| 4,508,629 A | 4/1985 | Borchardt |
| 4,517,306 A | 5/1985 | Buss |
| 4,524,003 A | 6/1985 | Borchardt |
| 4,532,051 A | 7/1985 | Nuckels nee' Byth et al. |
| 4,580,627 A | 4/1986 | Argabright et al. |
| 4,629,000 A | 12/1986 | Hurd |
| 4,632,786 A | 12/1986 | Stapp et al. |
| 4,633,947 A | 1/1987 | Luetzelschwab |
| 4,643,258 A | 2/1987 | Kime |
| 4,653,584 A | 3/1987 | Ball et al. |
| 4,720,348 A | 1/1988 | Savins |
| 4,842,776 A | 6/1989 | Schmidt et al. |
| 4,852,652 A | 8/1989 | Kuehne |
| 4,986,354 A * | 1/1991 | Cantu .................... C09K 8/516 166/279 |
| 5,068,043 A | 11/1991 | Thigpen et al. |
| 5,080,809 A | 1/1992 | Stahl et al. |
| 5,186,257 A | 2/1993 | Stahl et al. |
| 5,318,709 A | 6/1994 | Wuest et al. |
| 5,382,371 A | 1/1995 | Stahl et al. |
| 1,960,877 A | 10/1999 | Funkhouser et al. |
| 5,968,879 A | 10/1999 | Onan et al. |
| 6,030,928 A | 2/2000 | Stahl et al. |
| 6,051,670 A | 4/2000 | Ahmed et al. |
| 6,225,263 B1 | 5/2001 | Collins et al. |
| 6,828,281 B1 | 12/2004 | Hou et al. |
| 7,091,159 B2 | 8/2006 | Eoff et al. |
| 7,114,568 B2 | 10/2006 | Eoff et al. |
| 7,182,136 B2 | 2/2007 | Dalrymple et al. |
| 7,559,372 B2 | 7/2009 | Cobb |
| 7,622,428 B2 | 11/2009 | Huff et al. |
| 7,730,950 B2 | 6/2010 | Nguyen et al. |
| 7,759,292 B2 | 7/2010 | Eoff et al. |
| 7,772,162 B2 | 8/2010 | Pope et al. |
| 7,776,930 B2 | 8/2010 | Ubbels |
| 7,905,287 B2 | 3/2011 | Oyler et al. |
| 7,934,557 B2 | 5/2011 | Nguyen |
| 7,943,555 B2 | 5/2011 | Oyler et al. |
| 8,091,638 B2 | 1/2012 | Dusterhoft et al. |
| 2010/0010106 A1* | 1/2010 | Crews .................. B01J 13/0052 516/135 |
| 2010/0276150 A1* | 11/2010 | Sullivan ................ C09K 8/508 166/305.1 |
| 2011/0232904 A1 | 9/2011 | Lumsden et al. |
| 2012/0157356 A1* | 6/2012 | Dawson ................ C09K 8/602 507/219 |
| 2013/0020082 A1* | 1/2013 | Lumsden ............... C09K 8/584 166/279 |
| 2013/0277055 A1* | 10/2013 | Favero .................... E21B 43/16 166/305.1 |

OTHER PUBLICATIONS

T. Melnikova, International Search Report and Written Opinion of the International Search Authority, PCT/US2015/026805, Federal Institute of Industrial Property, Nov. 10, 2016.

* cited by examiner

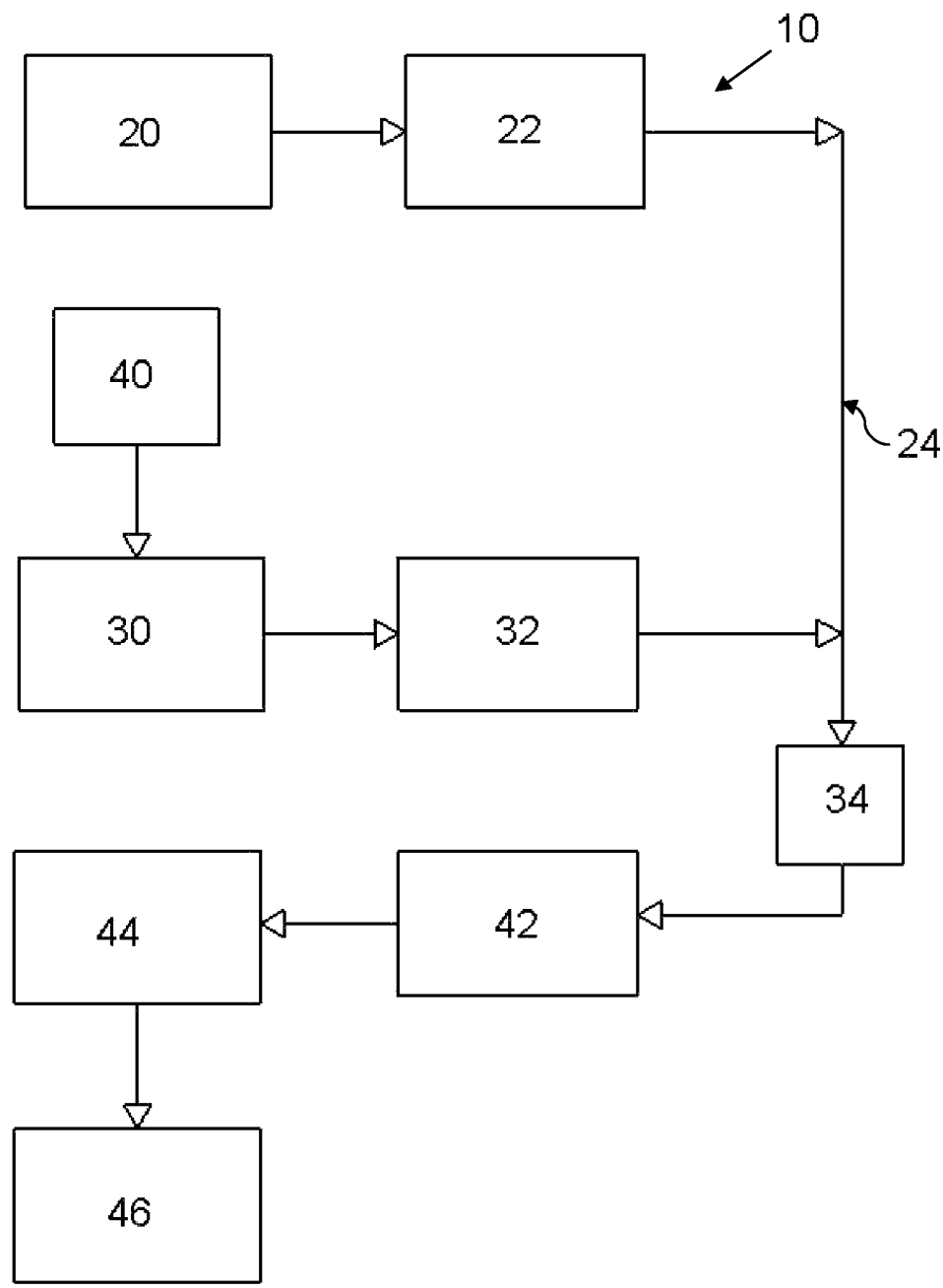

METHOD AND COMPOSITIONS FOR ENHANCED OIL RECOVERY

BACKGROUND OF THE INVENTION

1. Field of the Invention

The present invention relates to powder compositions for use in petroleum recovery and to methods for using such compositions in petroleum recovery.

2. Brief Description of the Prior Art

Petroleum recovery from underground formations can be a multistage process. While some petroleum may occur under pressure in such formations and may be extractable using primary processes depending on the pressure of the petroleum in the formation to expel the petroleum from the formation, petroleum often remains after primary processes have become ineffective. In such cases, secondary and tertiary processes may be useful to extract additional petroleum from the formations. In these latter processes, a fluid is typically injected into the formation under pressure through a first well to flood or drive residual petroleum to one or more extraction wells. The flooding fluid can be a gas such as carbon dioxide, or a liquid, such as water obtained locally, such as fresh or sea water. Depending on the nature of the formation, it is often desirable to increase the viscosity of the flooding fluid. This can be accomplished by the addition of a polymeric material to the flooding fluid. The polymeric material may be a natural polymeric material of biological origin, such as, for example, biopolysaccharides, disclosed in U.S. Pat. No. 4,458,753, incorporated herein by reference, or a synthetic polymer, such as, for example, polyacrylamide.

Dissolved oxygen in the flooding fluid can present a number of problems. For example, in the case of biological polymers in particular, dissolved oxygen can accelerate the degradation of the polymer, resulting in an undesirable reduction in the viscosity of the flooding fluid. In addition, dissolved oxygen can have a corrosive effect on equipment used to provide the flooding fluid to the formation, such as pumps, mixing equipment, well casings and the like.

Numerous attempts have been made to reduce the amount of dissolved oxygen in such flooding fluids. For example, U.S. Pat. No. 4,414,334 discloses the use of alcohol to react with dissolved oxygen in the presence of an alcohol oxidase to remove the free oxygen from a fluid. Sodium dithionite compositions have also been employed, such as disclosed in U.S. Patent Publication No. 2011-0232904 A1, incorporated herein by reference. U.S. Pat. No. 4,059,533, incorporated herein by reference, discloses mixtures of sodium dithionite and sodium dithionate as oxygen scavengers in petroleum drilling fluids and in secondary and tertiary recovery operations.

Biopolymers such as xanthan gums, produced by fermentation of using bacteria of the genus *Xanthomonas*, and similar biopolysaccharides, produced by fermentation of bacteria of the genus *Sclerotium* and of the genus *Alcaligenes*, have been used in flooding fluids, such as disclosed in U.S. Pat. No. 3,305,016, U.S. Pat. No. 3,372,749, and British Patent Specification 2,082,189, respectively. U.S. Pat. No. 4,458,753, incorporated herein by reference, discloses that the addition of an alkali metal borohydride to an aqueous solution of such biopolysaccharides improves the high temperature stability of the biopolymer. According to U.S. Pat. No. 4,218,327, incorporated herein by reference, the viscosity of xanthan gum-containing flooding fluids can be stabilized by removing substantially all dissolved oxygen, and then adding the xanthan gum polymer, at least one sulfur-containing antioxidant, and at least one water-soluble alcohol or glycol that is capable of being easily oxidized.

When ferric chloride plugging of water-flood flooding wells has been encountered, the addition of a water-soluble hydrosulfite, such as potassium, sodium, or ammonium hydrosulfite has proven to be useful in reducing oxidation of soluble ferrous chloride to insoluble ferric chloride, according to U.S. Pat. No. 3,343,601, incorporated herein by reference. U.S. Pat. No. 3,399,725, incorporated herein by reference, discloses a process for recovering crude oil from subterranean oil-bearing formations, using an aqueous flooding medium substantially free of molecular oxygen, and containing a water-soluble, substantially linear organic polymer. Ferrous ions are encountered in most hydrocarbon-bearing formations, and oxidation to the ferric state can result in degradation of the organic polymer, reducing the efficacy of the recovery process.

Currently, if an oxygen scavenger or iron-remover is needed to preserve the viscosity of polymer-water solutions, as is frequently used in enhanced oil recovery ("EOR") operations, the additives are injected into the water streams just before or just after the polymer is mixed in. However, the polymers themselves are sold as powders.

When polymeric materials are included in aqueous fluids for use in petroleum recovery, the polymeric material must be dissolved or dispersed in the fluids, typically by mixing operations. When stabilizers and/or oxygen scavengers are to be added to the petroleum recovery fluid, these components are separately mixed into aqueous streams, which requires separate sets of mixing equipment. Additional mixing equipment is also required for mixing these separate liquid streams with the aqueous stream containing the primary polymeric material. Such mixing operations create turbulence, which can simultaneously substantially increase the dissolved oxygen level in the aqueous fluid, to the detriment of subsequent petroleum recovery operations. Added mixing steps create even greater opportunities for the detrimental increase in the dissolved oxygen level in the petroleum recovery fluid. In addition, they increase the equipment cost and complexity of preparing the petroleum recovery fluid.

There is a continuing need to reduce the equipment cost and complexity of preparing fluids employed in petroleum recovery operations while reducing the dissolved oxygen level of such fluids more efficiently.

SUMMARY OF THE INVENTION

The present invention is directed to a powder composition obtained by adding oxygen scavengers, for example sodium borohydride, to polymers. This single powdered formulation can then be utilized in existing EOR applications without the need for ancillary injection equipment. By the oilfields having only a single material to dissolve, their tasks are made easier while still protecting the integrity of the polymer-water flood material. The term powder as used herein means a particulate or granular solid.

The present invention provides a process for preparing a flooding fluid for use in petroleum recovery from a petroleum-bearing formation. In addition, the present invention provides a powder composition that allows the flooding fluid, i.e. the petroleum recovery fluid, to be prepared using a single liquid mixing step. By reducing the number of required mixing steps, increases in the dissolved oxygen in the process stream due to additional mixing steps are avoided, which in turn minimizes the amount of oxygen scavenger required. The process includes providing an input fluid, such as an aqueous fluid, or a non-aqueous fluid such as monoethylene glycol, having oxygen dissolved therein. In one aspect of the invention, the input fluid is aqueous fluid, such as an aqueous brine solution, and in particular, an alkaline aqueous brine solution. The process further includes, in one embodiment, mixing a powder composition comprising at least one polymeric material and at least one oxygen scavenger with the input fluid to obtain a petroleum recovery fluid having a reduced level of dissolved oxygen. The oxygen scavenger may comprise at least one water-soluble borohydride.

Another aspect of the invention is a powdered composition comprising at least one polymeric material and at least one oxygen scavenger. The powdered composition may include additional components such as alkaline agents. Examples of alkaline agents include the alkali metal hydroxides such as sodium hydroxide. The alkaline agent may be present in an amount that is 1.5 to 10 times the amount of the oxygen scavenger by weight. Preferably, the alkaline agent is present in an amount that is 2.3 to 4.5 times the amount of the oxygen scavenger by weight. More preferably, the alkaline agent is present in an amount that is 2.6 to 3.5 times the amount of the oxygen scavenger by weight.

In a presently preferred embodiment, the present invention provides a process for preparing a flooding fluid for use in petroleum recovery from a petroleum-bearing formation, which in this embodiment the process comprises:

(a) providing an input fluid having oxygen dissolved therein;

(b) mixing a powder composition comprising at least one polymeric material and at least one oxygen scavenger with the input fluid to provide a flooding fluid for use in enhanced oil recovery.

The quantity of the oxygen scavenger should be at least great enough to reduce the level of dissolved oxygen in the flooding fluid to less than a detectable amount. Preferably, the amount of oxygen scavenger is adjusted such that the flooding fluid contains at least about $6.6 \times 10^{-8}$ moles borohydride per gram of flooding fluid after the dissolved oxygen in the input fluid has been scavenged, and more preferably, the flooding fluid contains from about $6.6 \times 10^{-8}$ to $2.64 \times 10^{-7}$ moles borohydride per gram of flooding fluid after the dissolved oxygen in the input fluid has been scavenged.

Preferably, the at least one water-soluble borohydride is selected from the group consisting of lithium borohydride, sodium borohydride, and potassium borohydride. More preferably, the at least one water-soluble borohydride is sodium borohydride.

The polymeric material can be a synthetic polymeric material or a naturally occurring polymeric material. In one aspect of the present invention, the synthetic polymeric material is preferably an anionic synthetic polymeric material. Preferably, the anionic synthetic polymeric material is selected from the group consisting of polyacrylamides, homopolymers and copolymers including at least one ethylenically unsaturated carboxylic acid. In another aspect, it is preferred that the synthetic polymer is selected from the group consisting of carboxymethylcellulose, hydroxyethylcellulose and carboxymethylhydroxyethylcellulose.

In one aspect, the process of the present invention further includes providing at least one surfactant in the powdered composition such that the flooding fluid further comprises the least one surfactant.

In another aspect of the present invention, the powder composition further comprises a basic stabilizing agent. In one embodiment of the present invention the basic stabilizing agent is water-soluble base, such as sodium hydroxide or potassium hydroxide.

The present invention also provides a process for petroleum recovery from a petroleum-bearing formation. The process includes providing an input fluid, such as an aqueous fluid, or a non-aqueous fluid such as monoethylene glycol, having oxygen dissolved therein. In one aspect of the invention, the aqueous fluid is an aqueous brine solution, and in particular, an alkaline aqueous brine solution. The process further includes, in one embodiment, of mixing a powder composition comprising at least one polymeric material and at least one oxygen scavenger with the input fluid to provide a flooding fluid for use in EOR that has reduced levels of dissolved oxygen therein.

The process further comprises injecting the flooding fluid into the petroleum-bearing formation; and extracting residual petroleum from the petroleum-bearing formation. Preferably, the amount of oxygen scavenger is adjusted such that the flooding fluid contains at least about $6.6 \times 10^{-8}$ moles borohydride per gram of flooding fluid after the dissolved oxygen in the fluid has been scavenged, and more preferably, the flooding fluid contains from about $6.6 \times 10^{-8}$ to $2.64 \times 10^{-7}$ moles borohydride per gram of flooding fluid after the dissolved oxygen in the input fluid has been scavenged.

Preferably, the at least one water-soluble borohydride is selected from the group consisting of lithium borohydride, sodium borohydride, and potassium borohydride. More preferably, the at least one water-soluble borohydride is sodium borohydride.

The polymeric material can be a synthetic polymeric material or a naturally occurring polymeric material. In one aspect of the present invention, the synthetic polymeric material is preferably an anionic synthetic polymeric material. Preferably, the anionic synthetic polymeric material is selected from the group consisting of polyacrylamides, homopolymers and copolymers including at least one ethylenically unsaturated carboxylic acid, and polyacrylonitriles, homopolymers and copolymers with at least one carboxylic acid. In one preferred embodiment, the synthetic polymer is a 50% anionic high molecular weight polyacrylamide. In another preferred embodiment, the synthetic polymer is a polyacrylonitrile/acrylic acid copolymer. In another aspect, it is preferred that the synthetic polymer is selected from the group consisting of carboxymethylcellulose, hydroxyethylcellulose and carboxymethylhydroxyethylcellulose. In another aspect, the polymeric material is a synthetic polymeric material selected from the group consisting of polyacrylamides, homopolymers and copolymers including at least one ethylenically unsaturated carboxylic acid, carboxymethylcellulose, hydroxyethylcellulose and carboxymethylhydroxyethylcellulose.

In one aspect, the process of the present invention further includes providing at least one surfactant in the powder composition, or alternatively mixing the at least one surfactant with the process stream in a step separate from the addition of the powder composition of polymeric material and oxygen scavenger such that the flooding fluid further comprises the least one surfactant. Preferably, the at least one surfactant is mixed with the process stream before the powder composition is mixed into the process stream.

In another aspect of the present invention, the powder composition further comprises a basic stabilizing agent. In one embodiment of the present invention the basic stabilizing agent is water-soluble base, such as sodium hydroxide or potassium hydroxide. In another embodiment of the present invention, the water-soluble base is sodium hydroxide.

In another aspect, the present invention provides a flooding fluid for enhanced oil recovery from subterranean formations.

In one aspect, the flooding fluid consists essentially of water, at least one water-soluble borohydride, and a polymeric material, the fluid having dissolved oxygen in a concentration less than a detectable amount.

In another aspect, the flooding fluid comprises a nonaqueous fluid, preferably monoethylene glycol, at least one water-soluble borohydride, and a polymeric material, the fluid having dissolved oxygen in a concentration less than a detectable amount.

In another aspect, the aqueous flooding fluid comprises water, at least one water-soluble borohydride, and a polymeric material, the fluid having dissolved oxygen in a concentration less than a detectable amount. In yet another aspect, the flooding fluid further includes at least one aqueous base. Preferably, the at least one water-soluble borohydride is sodium borohydride. Preferably, the level of base is sufficient to provide a pH of from about 9 to about 12. Preferably, the concentration of the sodium borohydride in the flooding fluid is from about 5 ppm to 200 ppm, more preferably from about 10 ppm to 100 ppm, still more preferably from about 25 ppm to 50 ppm.

The water-soluble borohydride is preferably encapsulated by an appropriate material to increase the shelf life of the powder composition. The powder compositions of the present invention yield flooding fluids for use in EOR operations having the desired viscosity while that viscosity is protected from breakdown.

BRIEF DESCRIPTION OF THE DRAWINGS

FIG. 1 is a block diagram showing an embodiment of the process of the present invention.

DETAILED DESCRIPTION

The process of the present invention provides a very rapid reduction in the level of dissolved oxygen in the water or another aqueous fluid or a nonaqueous fluid such as monoethylene glycol being used in secondary and tertiary or "enhanced" petroleum recovery operations from subterranean formations. The process permits rapidly preparing a flooding fluid, including a polymeric material with a very low level of dissolved oxygen. The level of dissolved oxygen can be reduced almost instantaneously to below detectable levels using the present process. By "less than a detectable concentration" or "less than a detectable amount" of dissolved oxygen is meant a level of dissolved oxygen characterized by an oxygen reduction potential of less than −1000 mV.

The process can be used to prepare aqueous and nonaqueous flooding fluids for use in polymer flooding petroleum recovery operations, in surfactant-polymer ("SP") flooding petroleum recovery operations, and in alkaline-surfactant-polymer ("ASP") petroleum recovery operations.

The fluid employed in the process of the present invention can be any type of aqueous or non-aqueous fluid employed in secondary and/or tertiary petroleum recovery operations. For example, the aqueous fluid can be fresh water obtained from the local domestic water supply or from local wells, or recycled or reclaimed water. Alternatively, the aqueous fluid can be brine obtained from local saltwater sources, or a brine prepared by adding suitable inorganic materials to fresh water, such as by adding soda ash (sodium carbonate) to provide an alkaline solution, such as an alkaline solution having a pH of from about 9 to 11, generally known in the art as a "produced" brine. Alkaline brines can be produced by the addition of caustic soda, sodium silicate, or sodium hydroxide. Such produced brines frequently have a high concentration of divalent ions such as greater than 1000 ppm. Alkaline solutions may be preferred depending on the nature of the petroleum in the subterranean formation, as well as the nature of subterranean formation itself. For example, the petroleum may contain acidic materials such as naphthalenic acids that can be converted by chemical reaction with the alkaline solution to surfactant material (soaps) beneficial to the recovery operation. The alkaline solution may also enhance oil recovery by reducing the amount of added surfactant which is retained by the rock in the subterranean formation.

The input fluid can also be a nonaqueous fluid such as organic diols, triols, and the like, such as monoethylene glycol, diethylene glycol, triethylene glycol, and polyethylene glycols.

The powder or particulate composition of the present invention is added to and mixed with the input fluid in the process of the present invention, to dissolve or disperse the components of the powder composition in the input fluid. The powder or particulate composition of the present invention includes at least one polymeric material and at least one oxygen scavenger. Preferably water-soluble polymeric materials are employed in the powder composition of the present invention such that adding and mixing the powder composition provides a solution of the polymeric material in the input fluid. The amount and type of water-soluble polymeric material to be used in the powder composition of the present invention and the amount of the powder composition mixed with the input fluid depends upon the hydrophobic/hydrophilic balance of the input fluid, the viscosity desired for the flooding fluid, and the characteristics of the subterranean formation. Increasing the viscosity of the flooding fluid can increase the amount of petroleum recovered, depending on the characteristics of the specific subterranean formation, as can be determined by those skilled in the art.

The oxygen scavengers in the powder composition of the present invention are preferably present in a ratio by weight of oxygen scavenger to oxygen scavenger/polymer material in the range from 1 ppm to 1000 ppm. Even more preferably, the oxygen scavenger is present in a ratio by weight of oxygen scavenger to oxygen scavenger/polymer material in the range from 20 ppm to 600 ppm. Yet more preferably, the oxygen scavenger is present in a ratio by weight of oxygen scavenger to oxygen scavenger/polymer material in the range from 30 ppm to 400 ppm. Even more preferably, the oxygen scavenger is present in a ratio by weight of oxygen scavenger to oxygen scavenger/polymer material in the range from 40 ppm to 250 ppm. Most preferably, the oxygen scavenger is present in a ratio by weight of oxygen scavenger to oxygen scavenger/polymer material of approximately 50 ppm.

Alkali metal borohydrides and alkali metal dithionites are the preferred oxygen scavengers for use in the powder composition of the present invention, with alkali metal borohydrides being the more preferred of the two. Sodium borohydride is the most preferred oxygen scavenger for use in the powder composition of the present invention. In addition to the alkali metal borohydrides and the alkali metal dithionites, mixtures of these with other types of oxygen scangers, to the extent that they are chemically compatible with the primary borohydride or dithionite scavenger, may also be used in the powder composition of the present invention. Examples of suitable oxygen scavengers that may also be used in admixture with the primary oxygen scavenger include other alkali metal borohydrides, bisulfite, metabisulfite, and sulfite salts, other dithionite salts, dithionate salts, hydrazines including 1-aminopyrrolidine, guanidines, semicarbazide and carbohydrazides, hydroxylamines, oximes, activated aldehydes, polyhydroxyl compounds, and enzymes that catalyze the reaction between a substrate material and oxygen. The combinations of oxygen scavengers may be used with the total amount of oxygen scavenger being present in the same proportions in relation to the polymer material as stated above. As an example, mixtures of alkali metal borohydrides, bisulfite, metabisulfite, and sulfite salts, dithionite salts, and dithionate salts may be used. Also, a combination of alkali metal borohydrides and alkali metal dithionites may be used. In any of the aforementioned mixtures, alkali metal borohydrides would preferably constitute from approximately 30% to approximately 90% by weight of the oxygen scavenger mixture. More preferably, the alkali metal borohydrides would constitute from approximately 50% to approximately 90% by weight of the oxygen scavenger mixture. Even more preferably, the alkali metal borohydrides would constitute from approximately 70% to approximately 90% by weight of the oxygen scavenger mixture. Examples of polymers that can be employed in the process of the present invention include synthetic polymers such as homopolymers and copolymers of ethylenically unsaturated monomers, including, for example, acrylic acid, methacrylic acid, itaconic acid, vinyl sulfonic acid, ethyl methacrylate, butyl acrylate, lauryl acrylate, methyl methacrylate, hydroxyethyl acrylate, acrylonitrile, acrylamide, methacrylamide, vinyl acetate, vinyl propionate, and the like. Further, chemically modified derivatives of such polymers can be employed, such as partially hydrolyzed polyacrylamide. Additional examples include polysaccharides such as cellulose derivatives including hydroxymethyl cellulose, hydroxyethyl cellulose, carboxymethyl cellulose, and carboxymethylhydroxyethyl cellulose. Biologically derived polymeric materials can also be employed, including gums such as guar gum and xanthan gum, and chemically modified derivatives thereof.

Polymers that can be employed in the process and compositions of the present invention are disclosed, for example, in U.S. Pat. Nos. 2,827,964, 2,923,734, 2,938,017, 3,948,740, 3,953,341, 4,060,490, 4,128,482, 4,254,249, 4,326,970, 4,406,799, 4,433,727, 4,503,909, 4,508,629, 4,524,003, 4,580,627, 4,633,947, 4,653,584, 4,852,652, 5,080,809, 5,186,257, 5,382,371, 5,960,877, 5,968,879, 6,030,928, 6,051670, 7,091,159, 7,114,568, 7,182,136, 7,622,428, 7,730,950, 7,759,292, 7,905,287, 7,934,557, 7,943,555, 8,091,638, and RE32,114, each incorporated herein by reference.

Typically, the amount of the powder composition of the present invention to be added to the input fluid is selected such that the resulting flooding fluid will contain a small amount of polymeric material (such as, for example, from about 200 to 1000 mg/l or ppm). The amount of the powder composition added to the input fluid should be enough to sufficiently increase the viscosity of the flooding fluid or "flood" used in flooding the subterranean petroleum formation so as to reduce the mobility of the flooding fluid in the formation. Polymeric materials having a high molecular weight, such as from about 2 to 5 million, are preferred for use in the powder composition of the present invention. Many different types of polymers have been proposed and evaluated for use in enhanced oil recovery systems. These include polyacrylamides, polyvinyl-pyrrolidones, hydroxyethylcelluloses, cellulose sulfate esters, guar gums, xanthan gums, and scleroglucans. Polymeric materials are useful to restrict the mobility of the flooding fluid so that the flooding fluid does not travel through the formation more quickly than the residual petroleum in the formation. The polymeric material may adsorb to formation surfaces and fill pores in the formation rock, thereby forcing the flooding fluid into previously unflooded portions of the formation, increasing the amount of petroleum recovery.

Optionally surfactants can be included in the powder composition of the present invention. Examples of surfactants that can be employed include ethoxylated alcohols, sulfonated oxyalkylated alcohols, polyalkylene glycol alkyl ethers, and the like. Surfactants that can be used in preparing the powder compositions or flooding fluids in accordance with the present invention are disclosed, for example, in U.S. Pat. Nos. 3,508,612, 3,638,728, 3,792,731, 2,800,823, 3,811,504, 3,811,507, 3,946,812, 3,977,471, 4,008,165, 4,018,278, 4,059,154, 4,066,126, 4,077,471, 4,088,189, 4,094,789, 4,120,358, 4,120,800, 4,122,020, 4,138,345, 4,143,716, 4,157,306, 4,161, 982, 4,181,178, 4,184,549, 4,187,073, 4,187,185, 4,192,382, 4,192,755, 4,192,767, 4,194,565, 4,214,999, 4,284,517, 4,293,428, 4,295,980, 4,296,812, 4,2299,711, 4,331,543, 4,340,492, 4,343,711, 4,426,302, 4,426,303, 4,455,254, 4,455,255, 4,460,481, 4,468,342, 4,469,604, 4,532,051, 4,629,000, 4,632,786, 4,643,253, 4,720,348, 4,842,776, 5,068,043, 5,318,709, 6,225,263, 6,828,281, 7,559,372, 7,772,162, and 7,776,930, each incorporated herein by reference.

The preferred oxygen scavenger for use in the powder composition of the present invention is sodium borohydride. While sodium borohydride is preferred, other borohydrides such as lithium borohydride, potassium borohydride, sodium cyanoborohydride, and mixtures thereof, can be employed.

Materials to be added to the input fluid can be added using any process and equipment known to the art, such as by conventional feed pumps, by mixing in mud pits, and the like. Preferably, however, methods of addition known to increase the level of dissolved oxygen in the aqueous fluid are to be avoided. Further, materials to be mixed with the input fluid can be mixed using any process and equipment known to the art, such mixing using one or more static mixers interposed in the flow of the process fluid. However, since some mixing equipment and techniques are known to increase the level of dissolved oxygen in the aqueous fluid they are to be avoided if practicable.

Preferably, data concerning a specific subterranean formation are collected before selecting the composition of the flooding fluid to be used to flood the formation in an enhanced oil recovery operation. For example, the formation can be logged, samples of the formation rock and the petroleum can be taken, and a static and or dynamic model for the formation can be developed using modeling software. Flow of petroleum in the formation depends on a number of forces, including viscous forces, capillary forces and gravity. Simulation software can be employed to predict the effect of different methods of enhanced oil recovery on the specific formation. Sample cores can be obtained from the formation and their flood characteristics evaluated. Similarly, pilot wells can be drilled and flooded to provide further information about the flood characteristics of the formation. Further, comparisons with effects of various methods of enhanced oil recovery on formations having similar characteristics can be made.

Further examples of surfactants useful for the powder composition or the flooding fluid in accordance with the present invention include one or more surfactants such as petroleum sulfonates, or rhamnolipids, in order to reduce the interfacial tension or capillary pressure that would otherwise impede the flow of petroleum through the subterranean formation.

FIG. 1 is a block diagram illustrating an embodiment of the process 10 of the present invention. A holding tank 20 contains a quantity of fresh water obtained from a local well (not shown). The fresh water 20 is pumped by a first metering pump 22 into a line 24. A second holding tank 30 contains an aqueous mixture, which is made by adding the powder composition 40 to a portion of the input fluid from tank 20 or a quantity of input fluid from some other source. The powder composition 40 includes at least an oxygen scavenger, for example sodium borohydride, and a polymer material in accordance with the present invention. The powder composition 40 may be held in a hopper or the powder composition may be manually loaded from bags into the tank 30. The aqueous mixture 30 is pumped by a second metering pump 32 into the line 24 and the mixture of the fresh water and the powder composition flow through a first static mixer 34. The mixture of the fresh water and the powder composition (or flood fluid) flows to an injection pump 42 which injects the flood fluid to a petroleum-bearing subterranean formation 44, whereby the flood fluid forces residual petroleum in the formation 44 to one or more collection wells 46 which extract the residual petroleum.

As shown in United States Patent Application Publication No. 20130020082, which is incorporated herein by reference, sodium borohydride and sodium dithionite are particularly effective as oxygen scavengers in EOR applications. These oxygen scavengers are also suitable for use in the powder composition of the present invention. Sodium dithionite is effective in reducing the oxygen concentration to below detectable limits at over 75 ppm in the flooding fluid. Sodium borohydride reduces oxygen to undetectably low levels (Oxygen Reduction Potential (ORP) reading <−1000 mV) at concentrations below 50 ppm in the flooding fluid.

Polymer materials particularly well suited for use in the powder composition of the present invention are anionic polyacrylamide copolymers and anionic polyacrylonitrile copolymers. Examples of suitable anionic polyacrylonitrile copolymers include acrylonitrile/acrylic acid copolymers. One example of a suitable polyacrylonitrile copolymer is one with a ratio of approximately 70% by weight of the sodium salt of acrylic acid (sodium acrylate) to approximately 30% by weight of acrylonitrile. Examples of suitable anionic polyacrylamide copolymers include high molecular weight anionic polyacrylamide copolymers. One example of a suitable anionic polyacrylamide copolymer is a 50% anionic high molecular weight polyacrylamide copolymer marketed under the name SNF Flo-Pam 956 VHM by SNF, Inc. of Riceboro, Ga., USA.

Preferably, the oxygen scavenger is present in the powder composition in a ratio in the range from 1 ppm to 1000 ppm by weight to the combination of the oxygen scavenger and polymer material. More preferably, the ratio of the amount of polymer material to the amount of oxygen scavenger, for example $NaBH_4$, is such that there is approximately the equivalent of 50 ppm of $NaBH_4$ by weight in relation to the combined weight of the oxygen scavenger and polymer material. This can be accomplished by powder blending or any other method suitable for mixing two powders. The oxygen scavenger, e.g., $NaBH_4$, may also be added as a liquid just prior to the drying of the polymer itself, yielding a ratio by weight of oxygen scavenger to oxygen scavenger/polymer material in the range from 1 ppm to 1000 ppm.

The $NaBH_4$ is preferably in the form of granules encapsulated in such a manner to prevent free water from reacting with the $NaBH_4$ while it is in dried polymer or to ensure that the reaction is at such a slow rate that the concentration of $NaBH_4$ in the powder is between 1 ppm and 1000 ppm after six months of storage. The encapsulation is destroyed by the addition of extra water or input fluid or by passing the powder composition or the powder composition/input fluid mixture though a mechanical blending device. Suitable encapsulating materials include, but are not limited to, water-soluble polymer coatings that include, for example, polyethyleneglycol, ethyl cellulose, nitrocellulose, cellulose acetate phthalate, shellac, polyacrylic acid, polymethacrylic acid, polyvinyl chloride, polyvinyl butyral, polyvinyl acetate, vinylic copolymers, polystyrene, polycarbonate, polymethyl methacrylate, a maleic anhydride copolymer, an alkyd resin, polybasic acid ester of cellulose, the polymer material of the power composition itself, e.g. polyacrylamide copolymer and polyacrylonitrile copolymer, and the like. The encapsulation process encapsulates a core of the oxygen scavenger by a coating of the water-soluble polymer that may be liquefied by melting or using a solvent that is later removed. The term acid as used in the appended claims encompasses the acid as well as the acid anion and the acid salt.

The polymer particles in the powder composition may have a particle size in the range of from approximately 200 to approximately 14 mesh. The encapsulated oxygen scavenger particles range in size from approximately 20 microns to approximately 5 mm. More preferably, the encapsulated oxygen scavenger particles range in size from approximately 50 microns to approximately 2 mm. Even more preferably, the encapsulated oxygen scavenger particles range in size from approximately 200 microns to approximately 2 mm.

Various modifications can be made in the details of the various embodiments of the processes, compositions and articles of the present invention, all within the scope and spirit of the invention and defined by the appended claims.

The invention claimed is:

1. A composition comprising:
   an oxygen scavenger; and
   at least one polymer material that is suitable for the preparation of flooding fluid for use in enhanced oil recovery, wherein the composition is in powder form and wherein said oxygen scavenger is present in an amount at least great enough to provide a flooding fluid having a level of dissolved oxygen that is less than a detectable amount, wherein said oxygen scavenger is selected from the group consisting of alkali metal borohydrides, alkali metal dithionites, and combinations thereof and is present in a ratio by weight of oxygen scavenger to oxygen scavenger/polymer material in the range from $1:10^6$ to $1000:10^6$.

2. The composition of claim 1, wherein said polymer material is selected from the group consisting of polyacrylamide homopolymers, polyacrylamide copolymers, polyacrylonitrile homopolymers, polyacrylonitrile copolymers, carboxymethylcellulose, hydroxyethylcellulose, carboxymethylhydroxyethylcellulose, and combinations thereof.

3. The composition of claim 2, wherein said oxygen scavenger is selected from the group consisting of sodium borohydride and sodium dithionite.

4. The composition of claim 3, wherein said polymer material is selected from the group consisting of anionic polyacrylamide copolymers, anionic polyacrylonitrile copolymers, and combinations thereof.

5. The composition of claim 4, wherein said polymer material is selected from the group consisting of anionic polyacrylamide copolymers having approximately 50% by weight of the anionic copolymer.

6. The composition of claim 5, wherein said polymer material is selected from the group consisting of polyacrylamide copolymers including at least one ethylenically unsaturated carboxylic acid.

7. The composition of claim 6, wherein said polymer material is selected from the group consisting of acrylamide/acrylic acid copolymers.

8. The composition of claim 5, wherein said oxygen scavenger is sodium borohydride.

9. The composition of claim 1, wherein said oxygen scavenger is present in a ratio by weight of oxygen scavenger to oxygen scavenger/polymer material of approximately $50:10^6$.

10. The composition of claim 8, wherein said oxygen scavenger is encapsulated by an encapsulating material.

11. The composition of claim 4, wherein said polymer material is selected from the group consisting of anionic polyacrylonitrile copolymers having approximately 70% by weight of the anionic copolymer.

12. The composition of claim 11, wherein said polymer material is selected from the group consisting of acrylonitrile/acrylic acid copolymers.

13. The composition of claim 12, wherein said oxygen scavenger is sodium borohydride.

14. The composition of claim 4, wherein the composition consists essentially of said polymer material, said oxygen scavenger, an encapsulating material encapsulating said oxygen scavenger, and a surfactant.

15. The composition of claim 4, wherein the composition consists essentially of said polymer material, said oxygen scavenger, an encapsulating material encapsulating said oxygen scavenger, a surfactant, and a base.

16. The composition of claim 15 wherein said base is sodium hydroxide.

* * * * *